United States Patent [19]

Washall et al.

[11] 4,038,377

[45] July 26, 1977

[54] REMOVAL OF SELENIUM FROM URETHANE SOLUTIONS

[75] Inventors: Thomas A. Washall, Wilmington, Del.; Harry Morgan, Upper Darby, Pa.

[73] Assignee: Atlantic Richfield Company, Los Angeles, Calif.

[21] Appl. No.: 727,811

[22] Filed: Sept. 29, 1976

[51] Int. Cl.² .............................................. C01B 19/00
[52] U.S. Cl. ................................... 423/510; 423/508; 423/509; 423/658.5
[58] Field of Search .............................. 423/508–510, 423/658.5

[56] References Cited

U.S. PATENT DOCUMENTS

| | | | |
|---|---|---|---|
| 1,915,703 | 6/1933 | Towne et al. | 423/510 |
| 2,406,666 | 8/1946 | Clark et al. | 423/509 |
| 3,268,294 | 8/1966 | Roberts et al. | 423/509 |
| 3,437,453 | 4/1969 | Serpinet | 423/509 |
| 3,577,216 | 5/1971 | Weiss et al. | 423/509 |

*Primary Examiner*—Edward Stern
*Attorney, Agent, or Firm*—Delbert E. McCaslin

[57] ABSTRACT

A method for the removal and recovery of selenium by liquid-liquid extraction from a urethane containing selenium compound by contacting a hydrocarbon solvent solution of the selenium-containing urethane at a suitable temperature with an aqueous ammonium hydroxide or alkali metal hydroxide solution and recovering the selenium from the resulting selenium compound enriched aqueous hydroxide phase; the deselenized urethane remaining in hydrocarbon phase.

21 Claims, No Drawings

REMOVAL OF SELENIUM FROM URETHANE SOLUTIONS

BACKGROUND OF THE INVENTION

In U.S. Pat. No. 3,895,054 there is disclosed a process for the manufacture of urethanes (carbamic acid esters) by reacting an organic compound containing at least one hydroxyl group, e.g., ethyl alcohol, with carbon monoxide and a nitrogenous organic compound, e.g., 2,4-dinitrotoluene at elevated temperature and pressure in the presence of a selenium catalyst and a base and/or water.

The present invention is directed to an effective method of recovering the selenium from urethane solutions produced, for example, by the above described process and containing selenium which may be in the form of selenium per se, inorganic selenium compounds and organo selenium compounds. Because of the high reactivity of selenium, when used as a catalyst as in the above reaction its combination with organic compounds very frequently results in the formation or organoselenium compounds, such as benzoselenazole, diethyl diselenide and other soluble selenium compounds which remain in solution with the urethane reaction product. In such reaction, a portion of the selenium catalyst such as the selenium per se or selenium dioxide, selenium disulfide, etc. is converted to one or more organoselenium compounds which may be classified generally as selenols, selenides, benzoselenazoles, esters of selenocarbonic acid, selenic acid and selenious acid, selenones and the like. The type and number of organoselenium compounds which may be formed is a function of the reaction conditions used to produce the urethanes such as time, temperature, pressure and solvent. In addition, the inorganic selenium compounds used as catalysts or formed in the reaction may also remain in solution with the urethane product.

Because of the cost and toxicity of selenium, it is essential that as much of the selenium be recovered from the urethane reaction product as is possible and from the inorganic or organoselenium compounds in a form suitable for reuse as a catalyst.

Prior art processes have been proposed for the recovery of selenium from certain organic reaction products and aqueous or acidic solutions. However, such prior art processes are generally narrow in scope and application and have proven to be of little or no value to the recovery of selenium from urethane solutions containing same.

U.S. Pat. No. 3,387,928, for example, proposes dissolving a selenium-containing material (ore concentrates and solutions) in a particular aqueous acid and admixing the aqueous acidic solution with a 2-hydroxyethyl-n-alkyl ether and allowing the resulting solution to stand to effect a separation of the selenium values into an organic phase.

U.S. Pat. No. 3,577,216 discloses a process for the recovery of selenium IV used as a catalyst in the oxidative production of carboxylic acids. The selective extraction of selenious acid in the presence of an aqueous solution of inorganic salts is disclosed wherein the selenious acid may be separated by liquid-liquid extraction in counterflow with a solvent and chemical treatment. No details of the extraction or solvent are set forth.

SUMMARY OF THE INVENTION

This invention relates to a process for the removal and recovery of selenium from organic solutions containing selenium or compounds thereof. More specifically, the present invention concerns a process for the liquid-liquid extraction of selenium compounds from urethanes obtained from the selenium catalyzed conversion of an organic nitrocompound to produce a urethane as described for example in the aforementioned U.S. Pat. No. 3,895,054 and incorporated herein by reference. The crude urethane products produced by such process, which may contain one or more organoselenium compounds as well as metallic selenium and/or inorganic selenium compounds, is distilled to remove and recover reaction solvents, unreacted alcohol and any amine base such as triethylamine which may be present. The remaining urethane/selenium is then contacted with or the distillate exchanged with an essentially water insoluble hydrocarbon, such as benzene, xylene, etc., and then an aqueous ammonium or alkali metal hydroxide solution, without affecting the urethane product and minimizing solubility and loss of urethane while substantially removing the selenium compounds. By such process of the invention substantial amounts of the selenium compounds are extracted into an aqueous hydroxide phase while the essentially deselenized urethane remains in a hydrocarbon phase. The selenium enriched aqueous phase may be separated from the hydrocarbon phase by any appropriate liquid phase separation method, such as decantation, and the selenium enriched aqueous caustic phase further processed leaving a selenium compound concentrate which may be treated to recover the selenium in a form suitable for reuse in the urethane synthesis reaction.

Advantages provided by the process of the present invention as compared to known selenium removal processes, are (1) the relative simplicity of adding an aromatic hydrocarbon to a urethane reaction product followed by a liquid-liquid extraction of selenium compounds with an aqueous hydroxide solution at low temperatures and (2) a relatively rapid extraction of the selenium from the urethane with substantially no loss of the urethane. The hydrocarbons employed must be essentially water insoluble and from a two phase system with the aqueous hydroxide solution.

It is an object of this invention therefore to provide a process for the substantial recovery of valuable selenium from selenium-containing urethane solutions and the ultimate purification of the urethane.

It is another object of this invention to provide a process for the recovery of selenium in a form suitable for recycle and reuse as a catalyst for the synthesis of urethanes from an organic compound containing at least one hydroxyl group with carbon monoxide and a nitrogenous organic compound.

It is a further object of this invention to recover contained selenium values from urethane solutions utilizing an aqueous ammonium hydroxide or alkali metal hydroxide solution to extract the selenium and to recover the selenium from the resulting aqueous hydroxide solution phase in a form suitable for recycle and reuse in the urethane synthesis process.

These and other objects and advantages of this invention will become apparent from the description of the invention which follows and from the claims.

DESCRIPTION OF THE INVENTION

In accordance with the present invention, a urethane solution containing selenium or compounds thereof, as for example, a urethane solution obtained by reacting an organic compound containing at least one hydroxyl group with carbon monoxide and an organic nitrogenous compound containing at least one non-cyclic group, in which a nitogen atom is directly attached to a single carbon atom and is also attached through a double bond to an oxygen or nitrogen atom, at elevated temperatures and pressures in the presence of a metallic selenium or selenium compound catalyst and a base and/or water, is distilled to remove contained alcohol, e.g., ethyl alcohol and any contained amine base, e.g., triethylamine, which materials are replaced or exchanged by an aromatic hydrocarbon, such as xylene leaving a hydrocarbon solution containing urethanes, selenium compounds, and any unreacted nitrogenous compounds. When metal salts of carboxylic acids, sulfonic acids and phosphoric acids are used as the base by the process of U.S. Pat. No. 3,895,054 they are of course not distilled off but precipitate upon the addition of the aromatic hydrocarbon and may be removed by, for example, filtration. The hydrocarbon/urethane/selenium solution is then subjected to a liquid-liquid extraction with an aqueous hydroxide solution such as ammonium hydroxide, at suitable temperatures, preferably between 60° C. and 90° C. to extract and remove selenium compounds from the hydrocarbon/urethane/selenium solution to provide an essentially deselenized urethane solution and to recover the valuable selenium.

The distillation of the crude effluent urethane solution to strip off unreacted alcohol and any amine base or water may be carried out under subatmospheric or atmospheric pressures at temperatures of from about ambient temperatures to 200° C. and preferably from about 50° C. to 150° C. The alcohols and amine bases may be stripped from the crude urethane solution leaving a residue of urethanes containing selenium compounds and possibly unreacted nitrogenous compounds, such as 2,4-dinitrotoluene, which is then dissolved in the essentially water insoluble hydrocarbon, or the alcohol and amine may be exchanged with the hydrocarbon during distillation so long as the hydrocarbon has a higher boiling point than the alcohols and amine base being removed. After addition of the aromatic hydrocarbon other bases, e.g., potassium acetate, which precipitate from solution may be filtered off leaving a hydrocarbon/urethane/selenium solution.

As indicated hereinabove, the hydrocarbon/urethane/selenium solution, when contacted with the aqueous hydroxide solution forms two phases, namely, a urethane containing hydrocarbon phase and a selenium containing aqueous hydroxide phase, which phases are readily separated, e.g., by decantation, for further processing to recover the urethane, hydrocarbon and selenium.

The amount and type of selenium compounds in the crude urethane reaction product will generally depend on the type and amount of selenium compound, including selenium per se, employed to produce the urethane as well as the reaction conditions and urethane being produced. Thus, the amount of selenium in the form of selenium per se, inorganic selenium compounds or organoselenium compounds, can range from about ½ to 5 percent but will generally be from about 1 to 3 percent by weight of the urethane solution produced, for example, by the process as set forth in U.S. Pat. No. 3,895,054.

The essentially water insoluble aromatic hydrocarbons, or mixtures thereof, which may be employed to form the hydrocarbon/urethane/selenium solution may be benzene and the alkyl and/or halogen substituted benzene derivatives such as, for example, xylenes, toluene, ethylbenzene, trimethylbenzene, dichlorobenzene, dibromobenzene, etc. The preferred hydrocarbons are benzene, xylenes and toluene.

While, as indicated, mixtures of the hydrocarbons may be employed, it is preferable to use individual hydrocarbons in order to lessen any recovery problem.

Generally from 80 weight percent and up to 90 weight percent of the aromatic hydrocarbon based on the total hydrocarbon/urethane/selenium solution is employed in order to carry out the liquid-liquid extraction of the selenium compounds from the solution upon contact with the aqueous hydroxide solution. Lesser amounts of the aromatic hydrocarbons may be used so long as a two phase system is produced on contact with the aqueous hydroxide solution. Larger amounts of hydrocarbon may also be used, i.e., up to 99+ percent but is avoided since there is no apparent improvement in results, and accordingly, the additional hydrocarbon would only necessitate the recovery of a larger volume of the hydrocarbon from the urethane rendering the process economically unattractive.

The hydroxide compounds which may be employed to form the aqueous hydroxide solutions for use in the process of the invention are ammonium hydroxide and alkali metal hydroxides which are soluble in water to an extent of at least 12 parts by weight of the hydroxide per 100 parts of water at ambient temperature, and are essentially insoluble in the urethane being treated. The hydroxide compounds used to prepare the aqueous solutions for use in the process of the invention include, ammonium hydroxide, cesium hydroxide, lithium hydroxide, potassium hydroxide, rubidium hydroxide and sodium hydroxide, with ammonium and sodium hydroxides being preferred.

The aqueous hydroxide solution may be added to the hydrocarbon/urethane/selenium solution at ambient temperatures or at temperatures of up to 100° C. depending on the temperature at which the extraction is to be carried out. Generally, the concentration of the aqueous hydroxide solution, e.g., a 1 percent or 30 percent solution, and the selenium compound content of the hydrocarbon/urethane/selenium solution to be treated will determine the volume ratio of hydroxide solution to be added. The volume ratio of aqueous hydroxide solution to hydrocarbon/urethane/selenium solution which may be employed to extract selenium compounds by the process is from about 10:1 to 1:100 preferably from 1:25 to 1:50.

The concentration of the hydroxides in the aqueous solutions employed may be from about 1 weight percent to about 50 weight percent and preferably from about 1 weight percent to about 30 weight percent.

The extraction process of the invention may be carried out at temperatures of from about ambient to temperatures of up to about 100° C. or no higher than the azeotrope of the hydrocarbon employed, and water. Preferably the extractions are carried out at temperatures between about 60° C. and 90° C.

Contact time of the aqueous hydroxide solution with the hydrocarbon selenium-containing urethane solution, to permit the extraction of the selenium compounds from the urethane, may vary within a range of from 1 minute to several hours depending on the selenium compound or compounds in the urethane solution to be removed and the temperature employed. Generally, the contact time will range between about 5 minutes and 1 hour. In addition, the extractions of a selenium-containing urethane solution may be carried out in a number of stages or successive treatments of the raffinate with the same or varied strength aqueous hydroxide solutions in order to optimize extraction and removal of the hydroxide soluble selenium compounds.

Once the selenium enriched aqueous hydroxide phase has been separated from the hydrocarbon/urethane phase, for example, by decantation, it may be treated in a number of ways to recover the selenium in catalytically useful form for further urethane synthesis. A preferred method, especially when alkali metal hydroxides are employed, is to back extract the selenium compounds from the aqueous phase with an essentially water insoluble solvent after essentially neutralizing the hydroxide solution with an acid which will effectively neutralize the hydroxide/selenium solution and permit effective solvent extraction of the selenium compounds from the neutralized solution.

The solvents or mixture of solvents which may be employed to back extract the selenium compounds from the neutralized aqueous hydroxide phase include the essentially water insoluble saturated hydrocarbons such as n-pentane, isopentane, n-hexane, ethyl pentane, etc.; aromatic hydrocarbons and halogenated hydrocarbons such as benzene, dichlorobenzene, dibromobenzene, xylenes, toluene, chloroform, methylene chloride, trimethylbenzene, etc.; esters such as ethyl acetate, butyl acetate, t-butyl acetate, etc. In back extracting the selenium compounds the solvents are generally employed at a ratio of solvent to aqueous hydroxide/selenium solution of about 1:3. Lower ratios of solvent to aqueous solution may be used, e.g., 1:5 or lower so long as a two phase system is produced along with effective extraction of the contained selenium compounds. Larger amounts of solvent to aqueous solution, e.g., 1:1 may be employed but is avoided since an excess of solvent would only necessitate the burdensome recovery of solvent during final recovery of the selenium as a concentrate from the hydrocarbon phase.

The neutralizing acids which may be employed in varying strengths include, for example, acetic, hydrochloric, sulfuric, hydrobromic, phosphoric, etc. with the mineral acids being preferred.

The temperatures employed to back extract the selenium compounds from the neutralized solution may be from about ambient to temperatures of up to about 100° C. or no higher than the azeotrope of the solvent employed and water. Preferred temperatures are from about 60° C. to 90° C.

When employing an aqueous ammonium hydroxide solution to extract selenium compounds from the hydrocarbon/urethane/selenium, in addition to back extracting the aqueous ammonium hydroxide/selenium phase, the ammonia and water may also be simply flashed or distilled off leaving a selenium compound concentrate for further treatment and recovery of selenium in useful form.

The selenium compound concentrate containing various selenium compounds, after recovery of the hydrocarbon, used to back extract the selenium compounds from the aqueous hydroxide solution or from an ammonium hydroxide solution, may be treated in a number of ways to recover the selenium in catalytically useful form. One method is to heat the concentrate to between 250° C. to 750° C. in an inert gas stream and collect the volatilized selenium per se. Another suitable method for recovery of the selenium is to convert the selenium, in the presence of air or oxygen, to selenium dioxide at temperatures of from 300° C. to 800° C., preferably 400° C. to 650° C., and recover the $SeO_2$ from the effluent reactor stream by cooling to below the sublimation point of $SeO_2$ (approx. 300° C.) to collect the $SeO_2$.

Selenium per se, which may also be present in the original crude urethane reaction product or in the solvent exchanged hydrocarbon/urethane/selenium solution, may be readily recovered preferably by bubbling air through the crude urethane solution to precipitate and essentially remove by filtration the contained selenium, and the selenium compounds then recovered by the process of the present invention.

Although the process of the present invention will be directed to the treatment for the removal and recovery of selenium compounds from a crude urethane which is a diethyltoluene-2,4-dicarbamate solution containing selenium compounds and produced by the process of U.S. Pat. No. 3,895,054, it is not intended that the process be limited to such carbamate solution and those skilled in the art will recognize that the present process is broadly applicable to the treatment of other urethanes such as methyl N-phenyl carbamate, diethyltoluene-2,6-dicarbamate, dibutyltoluene-2,4-dicarbamate, etc. which have been prepared, for example, by the selenium catalyzed process as described in U.S. Pat. No. 3,895,054.

The following Examples are provided to illustrate the recovery of selenium compounds from a urethane solution in accordance with the principles of this invention but are not to be construed as limiting the invention in anyway except as indicated by the claims.

In the Examples which follow the urethane solutions were obtained by taking the effluent from a metallic selenium catalyst conversion of 2,4-dinitrotoluene to the corresponding diurethane as described in U.S. Pat. No. 3,895,054. The crude urethane solutions contained approximately 17 percent ethanol, 50 percent diethyltoluene-2,4-dicarbamate and related by products, 30 percent triethylamine/pyridine mixture and approximately from about ½ to 3 percent selenium as unreacted metallic selenium, unidentified inorganic selenium and organoselenium compounds. After separation of the selenium enriched aqueous hydroxide phase the remaining deselenized hydrocarbon/urethane solution was analyzed by X-ray to determine selenium removal or subjected to high speed liquid chromatographic analysis to determine urethane content.

EXAMPLE I 5 grams of solids of selenium-containing diethyltoluene-2,4-dicarbamate (from a crude urethane after removal of ethanol, pyridine and triethylamine) were dissolved in 25 ml of benzene and the resulting benzene/urethane/selenium solution having a selenium content of 1.37 percent was contacted successively 3 times at ambient temperature with 25 ml portions of a 27 percent aqueous ammonium hyroxide solution and the hydrocarbon urethane containing phase separated from the selenium enriched aqueous ammonium hydroxide phase. Analysis of the hydrocarbon phases after each extraction gave values of 0.61, 0.62 and 0.62 percent indicating a 55 percent removal of selenium compounds. Essentially 100 percent of the urethane was recovered. The selenium enriched aqueous ammonium hydroxide phase was distilled to remove ammonia and water leaving a selenium compound concentrate which was further treated by heating to a temperature of 500° C. in the presence of air to convert the selenium contained in the concentrate to selenium dioxide which was recovered by cooling the effluent air/SeO$_2$ stream to approximately 250° C. to sublime the SeO$_2$.

EXAMPLE II

The procedure of Example I was repeated. 5 grams of solids of a selenium-containing diethyltoluene-2,4-dicarbamate were dissolved in 25 ml. of benzene and the resulting solution having a selenium content of 0.68 percent contacted successively 3 times with 5 ml portions of a 27 percent aqueous ammonium hydroxide solution at ambient temperature. Analysis of the hydrocarbon phases by X-ray indicated a 57.4 percent removal of selenium compounds.

EXAMPLE III 50 ml. of crude selenium-containing diethyltoluene-2,4-dicarbamate was distilled to remove ethanol, pyridine and triethylamine which materials were replaced with xylene. Air was bubbled through the resulting xylene/urethane/selenium solution (50 ml.) and filtered to remove precipitated selenium per se (13 percent of total selenium). The remaining xylene/urethane/selenium compound solution containing 1.64 percent selenium was contacted successively two times at 60° C. with a 30 percent aqueous sodium hydroxide solution at a hydrocarbon solution to hydroxide solution ratio of 40:1. Analysis of the xylene/urethane phase after separation showed removal of 85 percent of the soluble selenium compounds.

EXAMPLE IV

The procedure of Example III was repeated using the same air blown xylene/urethane/selenium compound solution. The solution was contacted successively 2 times at 90° C. with a 2.5 percent aqueous sodium hydroxide solution at a hydrocarbon solution to hydroxide solution ratio of 10:1. Analysis by X-ray of the xylene/urethane phase showed a soluble selenium compound removal of 90.3 percent. Essentially 100 percent of the urethane was recovered as determined by high speed liquid chromatographic analysis. The separated selenium containing aqueous sodium hydroxide phase was subjected to a back extraction of the selenium by essentially neutralizing the hydroxide solution with 3 cc. of a 20 percent solution of sulfuric acid, washing with 5 cc. of water, and contacting 2 successive times with a 50 cc. of xylene at 90° C. with stirring. The xylene layers containing the extracted selenium compounds were separated from the aqueous layer and analyzed by X-ray indicating that about 97 percent of the selenium was extracted into the xylene (organic) phases.

EXAMPLE V 100 cc. of a diethyltoluene-2,4-dicarbamate containing 1.26 percent selenium in xylene (prepared by exchanging distilled ethanol and amines with xylene from a crude urethane reaction solution) was contacted at 60° C. with 2.7 cc. of a 5 percent aqueous sodium hydroxide solution maintained at 60° C. After separation, of the phases, the raffinate (organic phase) was contacted at 60° C. with 2.7 cc. of a 0.5 percent aqueous sodium hydroxide solution and then 2.7 cc. of water at 60° C. Analysis of the xylene urethane containing phase showed an 85 percent removal of selenium compounds from the original xylene/urethane/selenium solution. Essentially 100 percent of the urethane was recovered.

The selenium containing aqueous extract solutions and water washes were combined, neutralized with a 30 percent solution of acetic acid and contacted with 100 cc. of ethyl acetate with stirring at 80° C. to back extract the selenium compounds. Analysis of the ethyl acetate/selenium extract showed 98+ percent selenium removal from the selenium-containing aqueous extract solution.

EXAMPLE VI

The procedure of Example V was repeated by contacting the xylene/urethane/selenium solution at 80° C. using 3.4 cc. of an aqueous 2 percent sodium hydroxide solution at 80° C., followed by contacting at 80° C. the raffinate with 3.4 cc. of 0.5 percent aqueous sodium hydroxide solution and a 3.4 cc. water wash. Analysis of the organic phase showed a 78.6 percent selenium removal with no loss in urethane. The combined aqueous extract solutions were again neutralized with acetic acid and back extracted with ethyl acetate giving 98+ percent selenium recovery from the selenium-containing aqueous extract solution.

EXAMPLE VII

A number of runs were made in accordance with the procedures of Example III, utilizing various concentrations of alkali metal hydroxide solutions at 90° C. with 4 successive extractions and a water wash and at various ratios of aqueous hydroxide solution to the xylene/urethane/selenium solution employed. The results are tabulated in Table I below showing certain values in weight percent.

TABLE I

| Run No. | 1 | 2 | 3 | 4 | 5 | 6 |
|---|---|---|---|---|---|---|
| Xylene/Urethane/Se Soln. (g) | 250 | 318 | 200 | 200 | 200 | 200 |
| Se Concentration % | 0.428 | 0.428 | 0.413 | 0.413 | 0.636 | 0.636 |
| Se Compounds % | 0.39 | 0.419 | 0.36 | 0.36 | 0.37 | 0.37 |
| Se Compounds (g) | 0.276 | 0.38 | 0.190 | 0.190 | 0.16 | 0.16 |
| Hydroxide Concentration | NaOH-1% | KOH-1M | NaOH-1% | NaOH-2% | NaOH-2% | NaOH-1% |
| cc.-Hydroxide Each Extraction | 50 | 50 | 15 | 7.5 | 7.5 | 15 |
| Total Se Extracted (g) | 0.246 | 0.34 | 0.179 | 0.169 | 0.13 | 0.14 |
| % Se Compounds Extracted | 89.1 | 89.5 | 94.2 | 88.9 | 81.3 | 87.5 |

We claim:
1. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:
   distilling the reaction product selenium-containing urethane solution at a temperature of from about ambient to about 200° C. to remove unreacted hy- droxyl compounds and any contained amine base compounds and/or water;

adding an essentially water insoluble aromatic hydrocarbon or alkyl or halogen substituted aromatic hydrocarbon to said distilled urethane solution forming a hydrocarbon-urethane-selenium-containing solution;

contacting the hydrocarbon-urethane-selenium solution at a temperature of from about ambient to a temperature of up to about 100° C. with an aqueous ammonium hydroxide or alkali metal hydroxide solution to extract selenium compounds from said solution and form a selenium-containing aqueous hydroxide phase and a urethane-containing hydrocarbon phase;

separating the selenium-containing aqueous hydroxide phase from the hydrocarbon phase;

treating the aqueous hydroxide phase to separate selenium compounds therefrom; and recovering said selenium.

2. A process according to claim 1 wherein the temperature is between about 50° C. to 150° C.

3. A process according to claim 1 wherein the water insoluble aromatic hydrocarbon is selected from the group consisting of benzene, toluene, and xylene.

4. A process according to claim 3 wherein the aromatic hydrocarbon is xylene.

5. A process according to claim 1 wherein from 80 to 90 weight percent water insoluble aromatic hydrocarbon based on the total hydrocarbon-urethane-selenium solution is added to the distilled urethane solution prior to contact with the aqueous hydroxide solution.

6. A process according to claim 1 wherein the alkali metal hydroxide compound used to prepare the aqueous hydroxide solutions are selected from the group consisting of cesium, lithium, potassium, rubidium, and sodium hydroxides.

7. A process according to claim 6 wherein the alkali metal hydroxide compound is soluble in water to an extent of at least 12 parts by weight of hydroxide compound per 100 parts by weight of water at ambient temperature.

8. A process according to claim 1 wherein the ratio of aqueous hydroxide solution to hydrocarbon-urethane-selenium-containing solution is from about 10:1 to 1:100.

9. A process according to claim 1 wherein the concentration of the hydroxide compound in aqueous solution is in the range of from about 1 weight percent to 50 weight percent.

10. A process according to claim 1 wherein the liquid-liquid extraction is carried out at temperatures of between about 60° C. and 90° C.

11. A process according to claim 1 wherein the selenium-containing aqueous hydroxide phase is acid neutralized and the neutralized solution contacted with an essentially water insoluble solvent to back extract the contained selenium compounds into a solvent phase.

12. A process according to claim 11 wherein the water insoluble solvent is xylene.

13. A process according to claim 11 wherein the water insoluble solvents to the neutralized hydroxide selenium solution are employed at a ratio of from about 1:3.

14. A process according to claim 11 wherein the neutralizing acid is selected from the group consisting of acetic, hydrochloric, sulfuric, hydrobromic and phosphoric acids.

15. A process according to claim 11 wherein the solvent phase is separated and the solvent distilled or evaporated from the solvent phase leaving a selenium compound concentrate.

16. A process according to claim 5 wherein the selenium compound concentrate is treated with air or oxygen at a temperature of from about 300° C. to 800° C. to convert the selenium compounds to selenium dioxide and recovering said selenium dioxide.

17. A process according to claim 11 wherein the selenium compound concentrate is heated to between about 250° C. to 750° C. in an inert gas stream to volatilize selenium and recovering said volatilized selenium.

18. A process according to claim 1 wherein the aqueous hydroxide solution is an ammonium hydroxide solution and the resulting selenium-containing aqueous ammonium hydroxide phase is distilled to remove ammonia and water leaving a selenium compound concentrate.

19. A process according to claim 18 wherein the selenium compound concentrate is treated with air or oxygen at a temperature of from about 300° C. to 800° C. to convert the selenium compounds to selenium dioxide and recovering said selenium dioxide.

20. A process according to claim 18 wherein the selenium compound concentrate is heated to between about 250° C. to 750° C. in an inert gas stream to volatilize selenium and recovering said volatilized selenium.

21. A process according to claim 1 wherein the reaction product selenium-containing urethane solution contains a metal salt of a carboxylic acid, sulfonic acid, or phosphoric acid as a base, said base being precipitated from the distilled urethane solution upon the addition of the aromatic hydrocarbon and is removed from the hydrocarbon-urethane-selenium-containing solution by filtration prior to the addition and extraction with the aqueous hydroxide solution.

* * * * *